United States Patent
Smith et al.

(10) Patent No.: US 6,426,723 B1
(45) Date of Patent: Jul. 30, 2002

(54) ANTENNA ARRANGEMENT FOR MULTIPLE INPUT MULTIPLE OUTPUT COMMUNICATIONS SYSTEMS

(75) Inventors: Martin Smith, Chelmsford; Sonya Amos, Ongar; Dean Kitchener, Brentwood; Dawn Power, Bishops Stortford; David Adams, Chelmsford, all of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/765,532

(22) Filed: Jan. 19, 2001

(51) Int. Cl.[7] .................................................. H01Q 1/38

(52) U.S. Cl. .............................. 343/700 MS; 343/846; 343/893

(58) Field of Search .......................... 343/700 MS, 846, 343/848, 878, 879, 829, 893

(56) References Cited

U.S. PATENT DOCUMENTS

| | | | | |
|---|---|---|---|---|
| 4,791,423 A | * | 12/1988 | Yokoyama et al. | 343/700 MS |
| 5,493,259 A | * | 2/1996 | Blalock et al. | 333/182 |
| 5,545,924 A | * | 8/1996 | Contolats et al. | 257/724 |
| 6,292,144 B1 | * | 9/2001 | Taflove et al. | 343/702 |

* cited by examiner

*Primary Examiner*—Don Wong
*Assistant Examiner*—Shih-Chao Chen
(74) *Attorney, Agent, or Firm*—Lee, Mann, Smith, McWilliams, Sweeney & Ohlson

(57) ABSTRACT

The present invention relates to antennas for radio communications, and in particular although not exclusively to multiple input multiple output (MIMO) radio communications systems. An antenna arrangement comprising: a first, a second, and a third ground plane each arranged substantially perpendicular to the others; a first, a second, and a third antenna element associated with respectively said first, said second, and said third ground planes, each antenna element arranged to radiate in a predetermined polarization in elevation and azimuth with respect to said respective associated ground plane.

13 Claims, 6 Drawing Sheets

ANTENNA ARRANGEMENT FOR MULTIPLE INPUT MULTIPLE OUTPUT COMMUNICATIONS SYSTEMS

FIELD OF THE INVENTION

The present invention relates to antennas for radio communications, and in particular although not exclusively to multiple input multiple output (MIMO) radio communications systems.

BACKGROUND OF THE INVENTION

The demand for wireless communication systems has grown steadily over recent decades, and has included several technological jumps over this time, particularly in the area of cellular and wireless local area network (WLAN) communication systems Analogue cellular phones have been replaced with digital handsets using for example GSM and CDMA technologies, and so called third generation systems such as UMTS are now being introduced. Similarly WLAN technologies such as HyperLan and IEEE 802.11b are also being introduced. The number of users continues to increase and data traffic is now becoming an important part of the wireless network. Both of these factors mean that it is important for operators to look for methods of increasing the capacity of their networks to meet future demands.

A relatively new radio communications technology known as multiple input multiple output (MIMO) systems which provide for increased system capacity by exploiting orthogonal propagation paths are being investigated for use in cellular and WLAN applications. Such systems exploit parallel or decorrelated radio channels between a receive and transmit antenna. A number of antenna elements are used on both the transmitter and receiver antennas which together with appropriate beam forming and signal processing technologies are capable of providing two or more orthogonal radio propagation channels between the two antennas. The antenna elements are spaced apart in order to decorrelate the signals associated with adjacent antenna elements. A problem exists, particularly at the base station of cellular systems where there is a low angle spread which requires the spacings to be very large, of the order of 10–20 wavelengths. This is typically less of a problem at the terminal of cellular systems there there is usually a large angle spread due to a large number of reflecting objects close to the terminal so that much smaller spacings between the antenna elements (between 0.25 and 0.5 wavelengths) are adequate. However this is still problematic given the increasing miniaturisation of these terminals. In addition the orthogonatity of the propagation paths is sensitive to the orientation of the terminal antenna which is especially problematic in portable terminals. Similar problems exist in WLAN applications.

There is a need for improved antenna arrangements for use with MIMO systems, particularly at the cellular and WLAN terminals.

SUMMARY OF THE INVENTION

It is an object of the present invention to provide an improved or at least alternative antenna arrangement for use with MIMO communications systems. It is a further object of the present invention to provide a MIMO antenna having a performance largely independent of antenna orientation.

In accordance with a first aspect the present invention provides an antenna arrangement comprising: a first, a second, and a third ground plane each arranged substantially perpendicular to the others; a first, a second, and a third antenna element associated with respectively said first, said second, and said third ground planes.

Preferably an antenna arrangement wherein each said antenna element is a transmission line loaded antenna having a section extending perpendicular and a section extending in parallel with respect to said associated ground plane.

Preferably an antenna arrangement wherein said antenna elements are arranged such that at any azimuth angle one of said antenna elements has a first predetermined polarisation, and another of said antenna elements has an orthogonal polarisation.

Preferably an antenna arrangement wherein said antenna elements are arranged such that a third of said antenna elements has one of said polarisations and is spaced apart from the antenna element having the same polarisation in any azimuth angle.

Preferably an antenna arrangement as further comprising a fourth antenna element associated with a fourth ground plane, wherein said fourth ground plane is parallel with said first ground plane, and wherein the parallel section of said first antenna element extends in a direction perpendicular to that of the parallel section of said fourth antenna element.

Preferably an antenna arrangement wherein said first and fourth ground planes are co-planar.

Preferably an antenna arrangement, wherein said antenna elements are planar inverted F antennas.

Preferably an antenna arrangement and further comprising an additional antenna element associated with each said ground plane.

Preferably an antenna arrangement wherein each said additional antenna element has a parallel section extending in a direction perpendicular to that of the parallel section of the other antenna on the associated ground plane.

Preferably an antenna arrangement as claimed in claim 1 wherein a said ground plane comprises metallised portions removed therefrom in order to improve the azimuth radiation pattern.

In accordance with a second aspect the present invention provides a Multiple input Multiple Output communications system comprising: an antenna arrangement comprising: a first, a second, and a third ground plane each arranged substantially perpendicular to the others; a first, a second, and a third antenna element associated with respectively said first, said second, and said third ground planes; and signal processing means arranged to implement a Space Time Coding communications transmission or reception method.

In accordance with a third aspect the present invention provides a method of implementing a wireless communications system and comprising: providing a first, a second, and a third ground plane each arranged substantially perpendicular to the others; a first, a second, and a third antenna element associated with respectively said first, said second, and said third ground planes; and providing signal processing means arranged to implement a Space Time Coding communications transmission or reception method.

In accordance with a further aspect the present invention provides an antenna arrangement comprising: a first, a second, and a third ground plane each arranged substantially perpendicular to the others; a first, a second, and a third antenna element associated with respectively said first, said second, and said third ground planes, each antenna element arranged to radiate in a predetermined polarisation in elevation and azimuth with respect to said respective associated ground plane.

BRIEF DESCRIPTION OF THE DRAWINGS

The present invention will now be described with reference to the following drawings, without intending to be limiting in which:

FIGS. 1a and 1b show plan and elevation views of a preferred antenna arrangement according to the present Invention;

DETAILED DESCRIPTION

The present invention recognises that for MIMO antenna systems in particular, it will be desirable to provide three or more diverse antenna elements in a compact radio terminal. The antennas need to provide substantially omnidirectional azimuth plane coverage without fading correlations between any pair of antennas. It is recognised that the signal received from the base station can arrive at any principal angle relative to the orientation of the terminal, which is determined by the users orientation. In practice there will be angle spread about the principal direction, for example of the order of 45° for an outdoor to indoor path and this can be advantageously exploited by the MIMO system to provide parallel channels from reasonably closely spaced antenna elements. Whilst the present invention has particular application in MIMO cellular and WLAN applications, the antennas could also be used in other applications such as standard receive or transmit diversity for example.

Figure 1C:
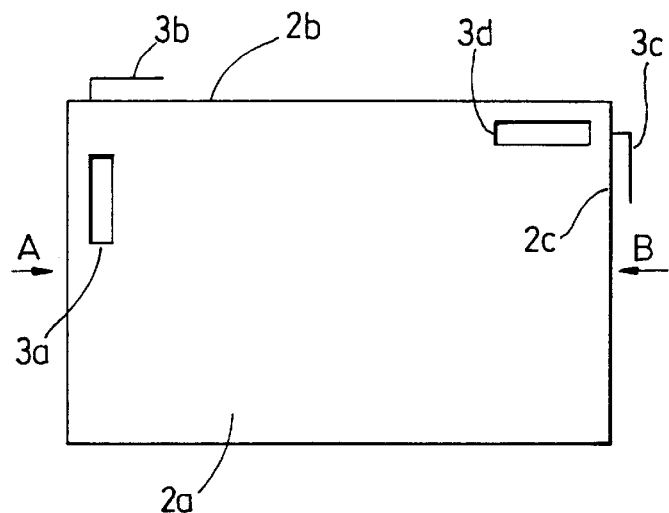
FIG. 1c shows a modified version of the antenna arrangement of FIGS. 1a and 1b.
Figure 1C:
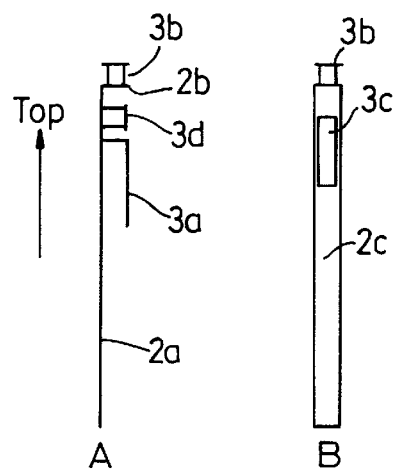
Figure 1C:
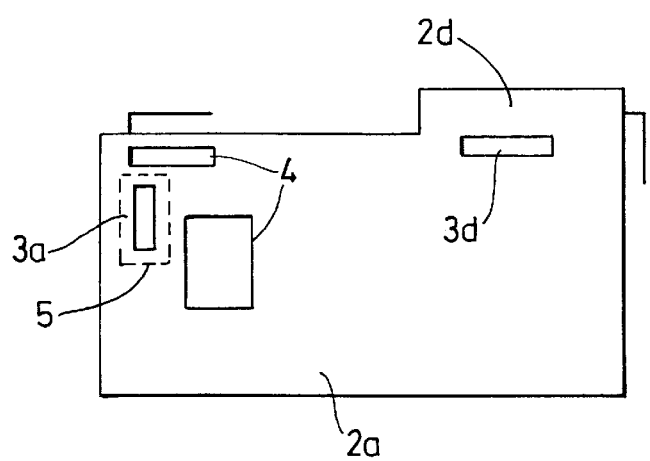
Figure 2:
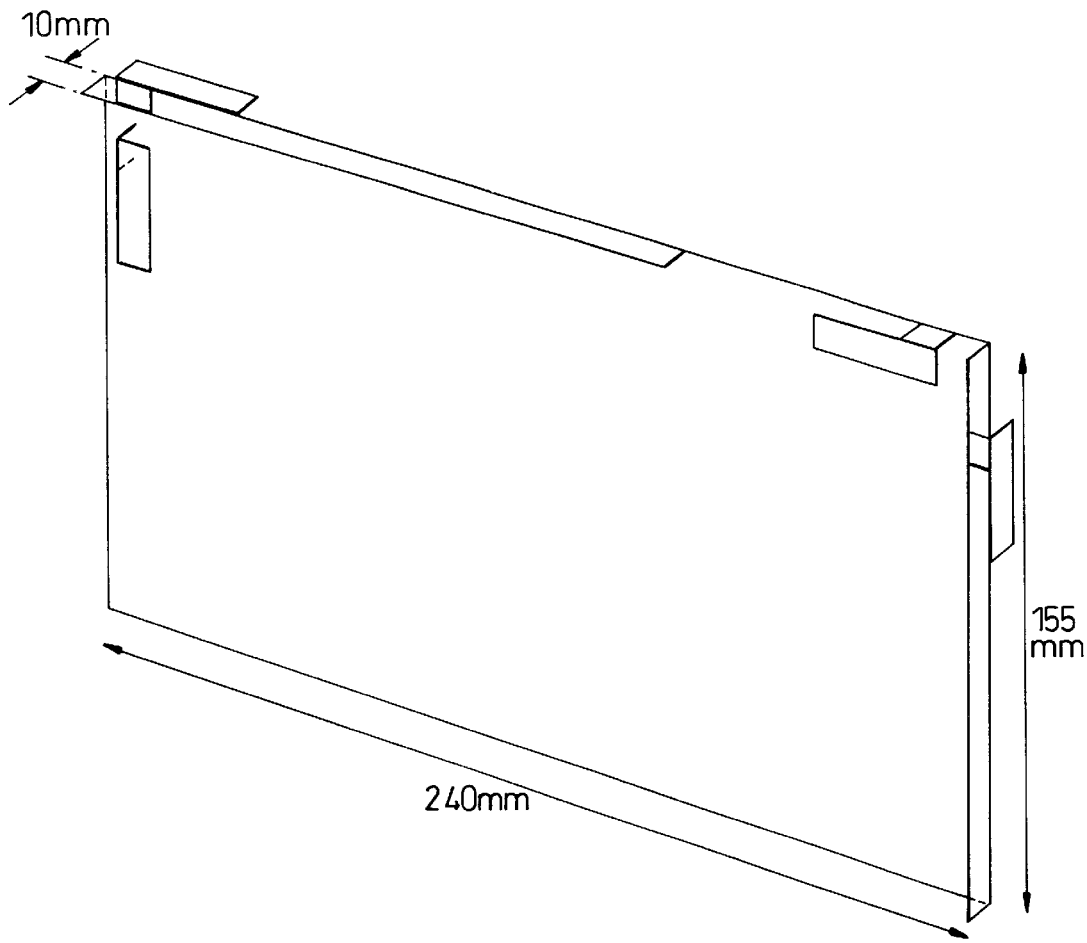
FIG. 2 shows a perspective view of the antenna arrangement of FIG. 1.

The antenna arrangement of the first preferred embodiment of the invention is shown in FIGS. 1a, 1b and 2. The antenna arrangement 1 comprises three orthogonal ground planes 2a, 2b and 2c, and three antenna elements, 3a, 3b and 3c, each associated or corresponding with one of the ground planes. The elements 3a, 3b and 3c are fed against their respective ground planes. The ground planes 2 may be of metal or metallized plastic for example. The antenna elements 3a–8c are each arranged to radiate in both elevation and azimuth with respect to their associated ground plane. Preferably each antenna element is arranged to radiate in azimuth with a predetermined polarisation; which varies from element to element at any azimuth angle. The antenna elements 3 preferably each comprise a section extending perpendicular to its respective ground plane and a section extending in parallel with its respective ground plane as shown. Preferably transmission line loaded antennas are used, for example bent folded monopoles, transmission line loaded monopoles, inverted F antennas, planar inverted F antennas.

Sections of one or more of the metallized ground planes can be removed close to the respective antennas to improve the azimuth radiation pattern. For example square or rectangular sections having dimensions similar to those of the antenna elements can be removed close to the antenna elements; whilst still leaving the ground plane "underneath" the antenna elements intact. Examples of these sections are shown in FIG. 1c and referenced 4. The antenna arrangement could also be constructed using a plastics base with metallisation sections for the ground planes. These can be arranged such that they only extend underneath the antenna element. An example of a section of metallisation 5 as the ground plane (2a) for element 3a is shown in dashed outline in FIG. 1c.

Collectively the antenna elements 3 comprise orthogonal polarisation components and also comprise spatial separation sufficient to increase the number of orthogonal channels available to MIMO system communications. Preferably the antenna elements 3a, 3b and 3c are arranged such that in each of the three spatial planes there are orthogonally polarised parts of the elements or the elements are arranged to transmit/receive signals in each spatial plane which are orthogonally polarised.

Preferably an additional antenna element 3d is provided against the main ground plane 2a. Antenna elements 3a and 3d are preferably fed against the same ground plane, but are spaced apart to provide spatial diversity. Preferably the sections of the antenna elements 3a and 3d which extend parallel to the ground plane 2a are orientated differently to provide polarisation diversity. Preferably these sections are orthogonal to each other. While the ground planes associated with antenna element 3a and 3d are preferably co-planar or the same ground plane, different ground planes could alternatively be used which are parallel to each other.

A preferred application for the antenna arrangement illustrated in FIGS. 1a and 1b is for use within a laptop computer enclosure, and in particular the screen part of that enclosure which is typically orientated vertically whilst in use. The metal parts of the laptop terminal have a major influence on the radiating properties of the antennas and preferably the antenna elements 3a–d are located adjacent the top corners of the main ground plane 2a. It has been determined that the screen of a laptop is also conducive and as such hinders the radiating characteristics of any elements located beneath it. Preferably therefore the antenna element 3d is also located near the top of the main ground plane 2a which preferably has an extension 2d illustrated in FIG. 1c, which is adjacent the antenna element 3d to aid matching. In order to fit within a laptop assembly, the antenna arrangement 1 is preferably less than 10 mm deep, The invention provides 3 or 4 independent antennas for three or four way diversity to allow MIMO operation in for example a 2:3 or 2,4 or 4:4 mode (2 or 4 antennas at the base, 3 or 4 at the terminal), to increase downlink capacity in a cellular radio system.

Measured azimuth patterns for the 4 antenna elements 3a–d are shown in FIG. 3a–d. It can be seen that the azimuth gain for each of the antenna elements is reasonably omnidirectional with a minimum of nulls such that the three or four way diversity performance of the antennas can be maintained at all azimuth angles. This omnidirectional azimuth performance is required because the laptop orientation is set by user needs, rather than the direction of the strongest signal from the base station.

Correlations between antennas 1 to 4, with 40 degree angle spread and full polarisation mixing, have been calculated as:

| Antenna | 1 | 2 | 3 | 4 |
|---------|---|---|---|---|
| 1 | — | 0.34 | 0.17 | 0.05 |
| 2 |   | — | 0.19 | 0.03 |
| 3 |   |   | — | 0.10 |

The performance of the four antennas is good, with low correlations between all four elements, and reasonable coverage in the azimuth plane.

Preferably planar inverted F antenna (PIFA) elements are Used. The two antenna elements 3a and 3d on the main ground plane 2a are separated as far as possible and are oriented orthogonally to each other, so that the polarisation characteristics of the four antennas are as different as possible, utilising all three perpendicular planes through the antenna arrangement 1.

Figure 3A:
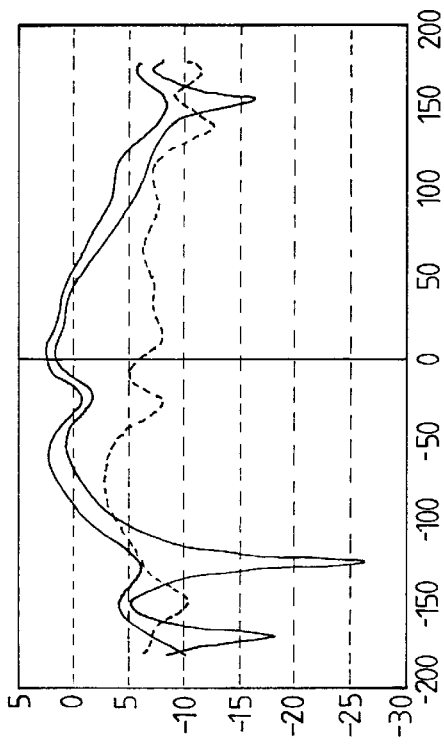
FIGS. 3a, b, c and d show the measured azimuth patterns for the four antenna elements of the antenna arrangement of FIG. 1.
Figure 3C:
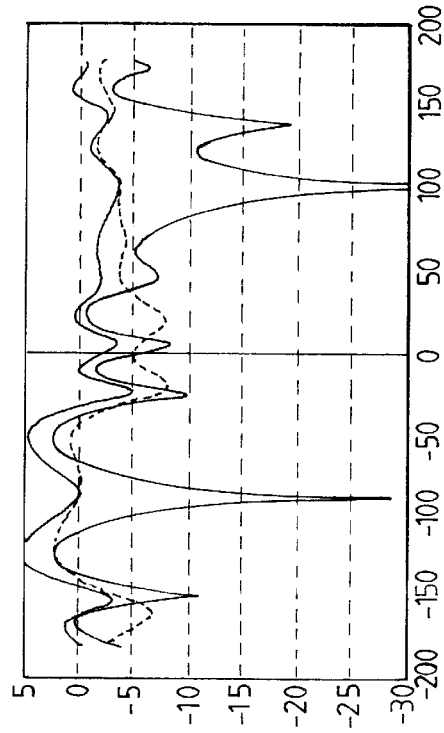
Figure 3B:
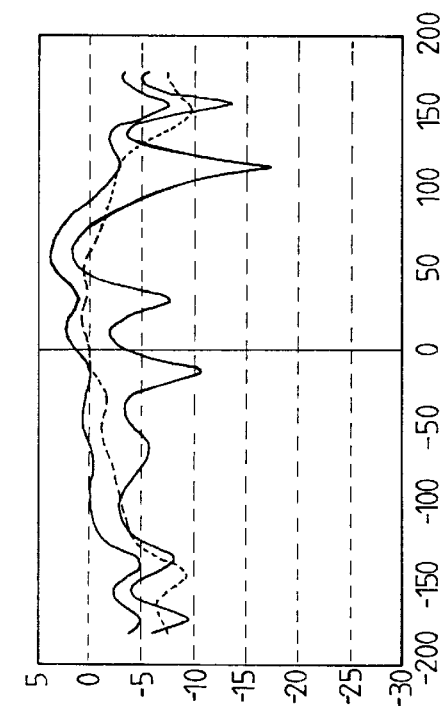
Figure 3D:
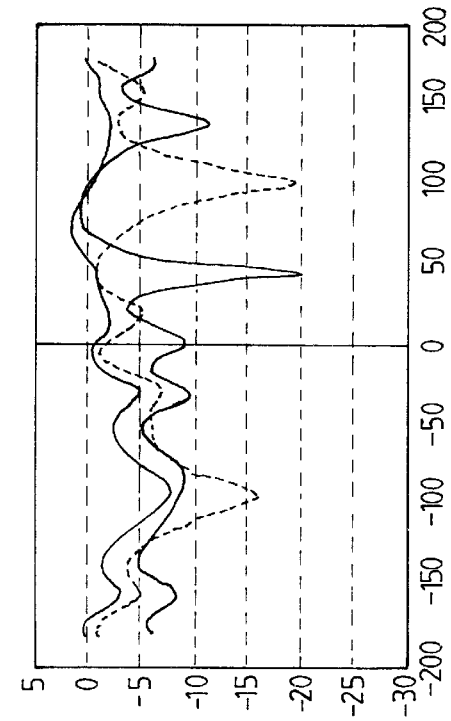
Figure 4A:
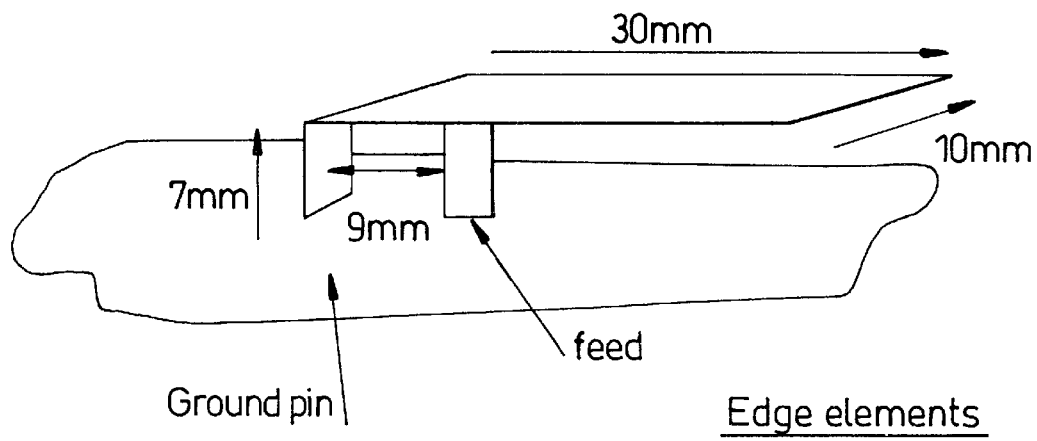
FIGS. 4a and 4b show detailed views of the preferred edge and face antenna elements of the antenna of FIG. 1.
Figure 4B:
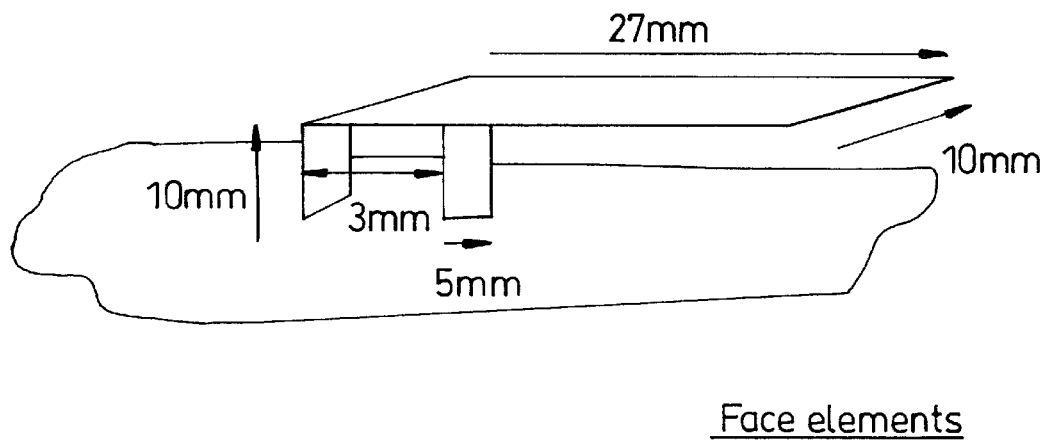

The preferred dimensions for these elements tuned to the PCS1900 frequency band are shown in FIGS. 4a and 4b. An edge element 3b or 3c having the minor ground planes 2b or 2c is shown in FIG. 3a, and a face element 3a or 3d having the main ground plane 2a is shown in FIG. 3b. The location of the ground pin with respect to the feeding pin has a direct effect on the tuning of the element. The configuration shown aids in tuning, and is preferred to having the ground and feed pins co-located which tends to be less stable and harder to match in practice. The air gap between the feed and ground pins is much less for the face elements 3a and 3d due to the larger ground plane. A decrease from 9 mm to approximately 3 mm has been used for the two different antenna element designs. The ground and pin feed structures are preferably 4 mm wide for the edge elements and 5 mm for the face elements which aids manufacturing. The edge elements are lower in height but longer in length than the corresponding face elements to obtain the best match with the different width ground plane. The width of the antenna arrangement 1 is 10 mm to allow the edge elements to fit within the depth of the laptop screen, while still allowing sufficient bandwidth for the PCS 1900 band (1850–1990 MHz.

The described antenna arrangement is advantageous over prior art arrangements which use four spatially separated antenna elements. Such antenna arrangements are not effective in all azimuth directions, and are therefore not ideal for mobile terminal applications. Whilst the described antenna arrangement 1 is optimised for a laptop computer, it could also be used in personal digital assistants (PDA's), mobile phones, vehicle terminals and stand alone antenna units. (Others?).

Figure 5:
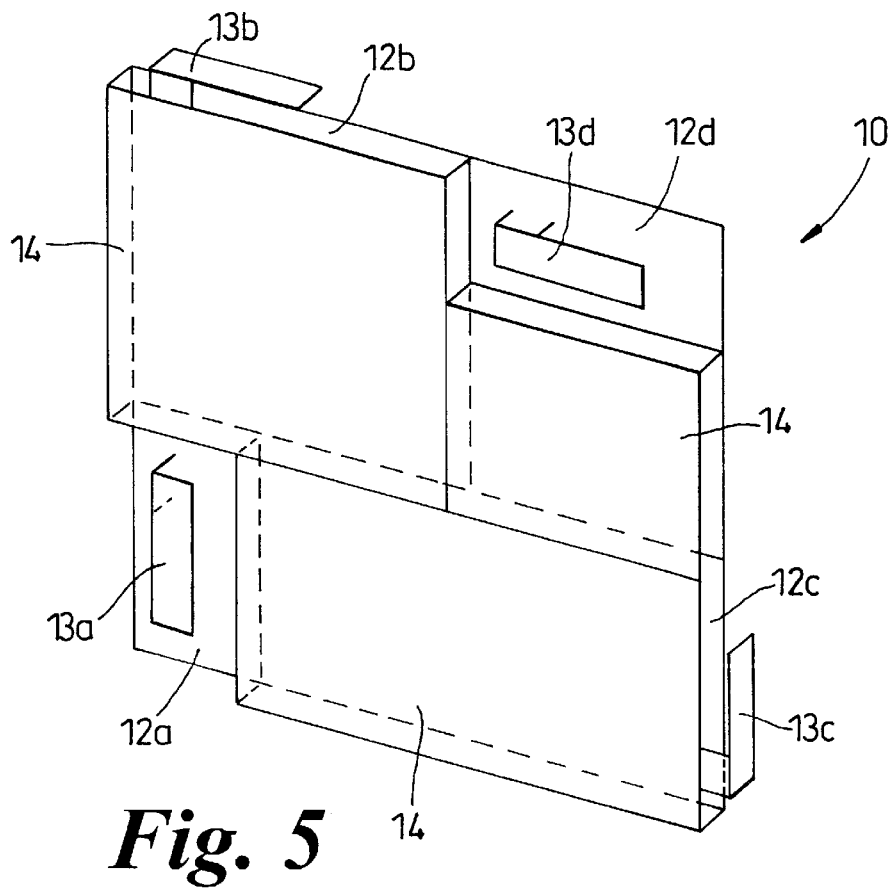
FIG. 5 shows a perspective view of a second preferred antenna arrangement according to the present invention.

FIG. 5 shows a second preferred embodiment antenna arrangement 10 of the present invention which comprises antenna elements 13a, 13b, 13c and 13d with respective ground plane sections 12a, 12b, 12c and 12d. The antenna elements 13 and ground plane sections 12 are analogous to those of the first preferred embodiment antenna arrangement 1, however the antenna elements 13 are more evenly spaced about the antenna arrangement 10 which improves its diversity performance when the unit is placed in a flat orientation, as then the azimuth spacings are maximised.

The antenna arrangement 10 however is not suitable for laptop computers which will have metal or conducting components near the base of the antenna arrangement which would interfere with the operation of the lower antenna elements 13a and 13d. This antenna arrangement 10 is more suitable-for a stand alone unit which might be connected to a computer terminal, laptop, PDA or hand held terminal not having its own internal antenna arrangement 1.

Figure 6:
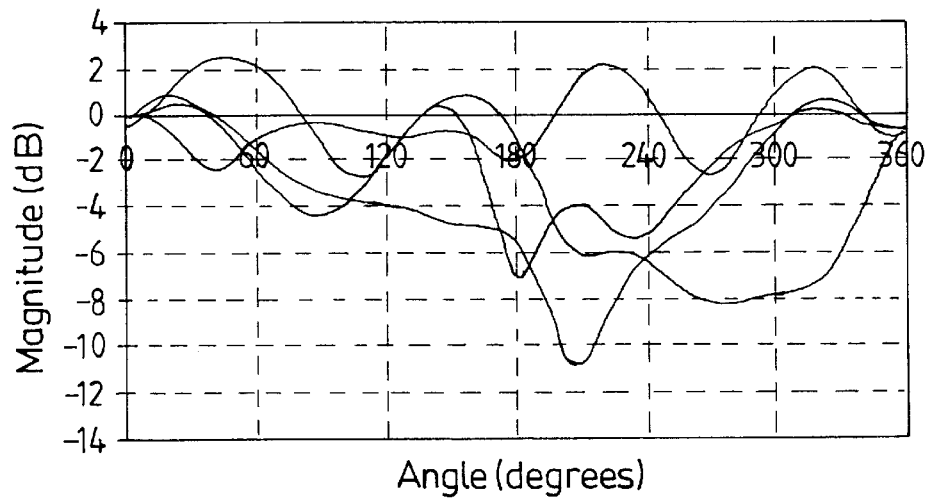
FIG. 6 shows measured azimuth gains of the antenna elements of the antenna arrangement of FIG. 5 in an upright position.
Figure 7:
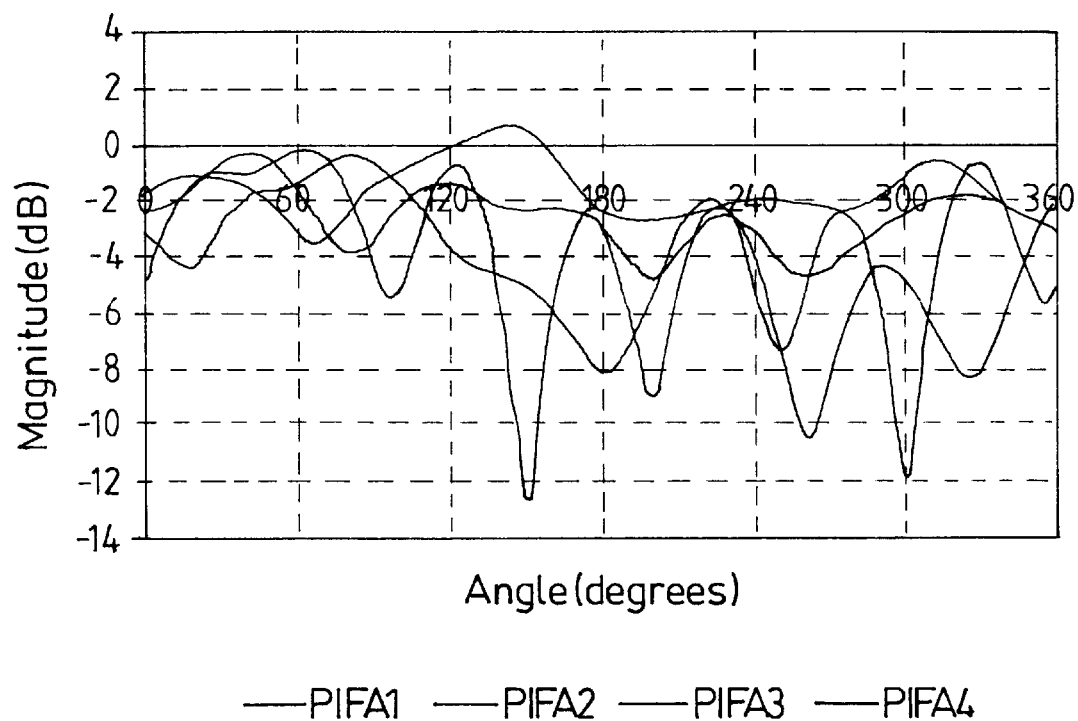
FIG. 7 shows the total azimuth gain of the antenna elements of the antenna of FIG. 5 in a flat or horizontal position.

FIG. 6 shows the total azimuth gain of PIFA antenna elements 13 whilst the antenna arrangement 10 is in an upright position, i.e. the ground planes 12a and 12d are vertically oriented. FIG. 7 shows the total azimuth gain of the same elements while the antenna arrangement 10 is in a flat position, i.e. ground planes 12a and 12b are horizontal. The total gain in each case is the sum of the powers in the horizontal and vertical polarisations.

Correlations between antennas 1 to 4, with 45 degree angle spread and full polarisation mixing, have been calculated as:
Upright position:

| Antenna | 1 | 2 | 3 | 4 |
|---------|---|---|---|---|
| 1 | — | 0.05 | 0.35 | 0.38 |
| 2 |   | — | 0.25 | 0.08 |
| 3 |   |   | — | 0.14 |

Flat position:

| Antenna | 1 | 2 | 3 | 4 |
|---------|---|---|---|---|
| 1 | — | 0.00 | 0.07 | 0.02 |
| 2 |   | — | 0.13 | 0.14 |
| 3 |   |   | — | 0.09 |

The performance of the four antennas is good, with low correlations between all four elements, and reasonable coverage in the azimuth plane for both upright and flat orientations.

The antenna arrangement 10 also comprises a number of metallized boxes 14 which form part of the ground plane structures 12. These boxes can be used to house radio frequency transmission and reception equipment as well as interworking functions for example to enable a computer port to be coupled directly to the antenna unit.

While the invention has been described with 3 or 4 diverse antenna elements 3 or 13, additional diverse antenna elements can be added to the antenna arrangement 1 or 10 to further improve MIMO system performance.

In a further preferred alternative, each ground place 2a or 12a, 2b or 12b, 2c or 12c and 2d or 12d has additional antenna elements (not shown). Preferably these antenna elements are also PIFA'a and preferably their parallel section is perpendicular to the parallel section of the other antenna element associated with that ground plane.

The invention has been described with reference to preferred embodiments thereof. Alterations and modifications as would be obvious to those skilled in the art are intended to be incorporated within the scope hereof.

What is claimed is:

1. An antenna arrangement comprising:

a first, a second, and a third ground plane each arranged substantially perpendicular to the others;

a first, a second, and a third antenna element associated with respectively said first, said second, and said third ground planes.

2. An antenna arrangement as claimed in claim 1 wherein each said antenna element is a transmission line loaded antenna having a section extending perpendicular and a section extending in parallel with respect to said associated ground plane.

3. An antenna arrangement as claimed in claim 1 wherein said antenna elements are arranged such that at any azimuth angle one of said antenna elements has a first predetermined polarisation, and another of said antenna elements has an orthogonal polarisation.

4. An antenna arrangement as claimed in claim 3 wherein said antenna elements are arranged such that a third of said antenna elements has one of said polarizations and is spaced apart from the antenna element having the same polarisation in any azimuth angle.

5. An antenna arrangement as claimed in claim 1 further comprising a fourth antenna element associated with a fourth ground plane, wherein said fourth ground plane is parallel with said first ground plane, and wherein the parallel section of said first antenna element extends in a direction perpendicular to that of the parallel section of said fourth antenna element.

6. An antenna arrangement as claimed in claim 4 wherein said first and fourth ground planes are co-planar.

7. An antenna arrangement as claimed in claim 1, wherein said antenna elements are planar inverted F antennas.

8. An antenna arrangement as claimed in claim 1 and further comprising an additional antenna element associated with each said ground plane.

9. An antenna arrangement as claimed in claim 8 wherein each said additional antenna element has a parallel section extending in a direction perpendicular to that of the parallel section of the other antenna on the associated ground plane.

10. An antenna arrangement as claimed in claim 1 wherein a said ground plane comprises metallised portions removed therefrom in order to improve the azimuth radiation pattern.

11. A Multiple Input Multiple Output communications system comprising:
    an antenna arrangement comprising:
        a first, a second, and a third ground plane each arranged substantially perpendicular to the others;
        a first, a second, and a third antenna element associated with respectively said first, said second, and said third ground planes; and
        signal processing means arranged to implement a Space Time Coding communications transmission or reception method.

12. A method or implementing a wireless communications system and comprising:
    providing a first, a second, and a third ground plane each arranged substantially perpendicular to the others;
    a first, a second, and a third antenna element associated with respectively said first, said second, and said third ground planes; and
    providing signal processing means arranged to implement a Space Time Coding communications transmission or reception method.

13. An antenna arrangement comprising:
    a first, a second, and a third ground plane each arranged substantially perpendicular to the others;
    a first, a second, and a third antenna element associated with respectively said first, said second, and said third ground planes, each antenna element arranged to radiate in a predetermined polarisation in elevation and azimuth with respect to said respective associated ground plane.

* * * * *